United States Patent
Choi et al.

(10) Patent No.: US 10,598,232 B2
(45) Date of Patent: Mar. 24, 2020

(54) TRANSMISSION SYNCHRONIZER

(71) Applicants: Hyundai Motor Company, Seoul (KR); Kia Motors Corporation, Seoul (KR)

(72) Inventors: Jae Young Choi, Busan (KR); Sung Wha Hong, Hwaseon-si (KR); Jong Yun Park, Hwaseon-si (KR)

(73) Assignees: Hyundai Motor Company, Seoul (KR); Kia Motors Company, Seoul (KR)

( * ) Notice: Subject to any disclaimer, the term of this patent is extended or adjusted under 35 U.S.C. 154(b) by 123 days.

(21) Appl. No.: 15/831,204

(22) Filed: Dec. 4, 2017

(65) Prior Publication Data

US 2018/0335093 A1  Nov. 22, 2018

(30) Foreign Application Priority Data

May 16, 2017 (KR) .................. 10-2017-0060553

(51) Int. Cl.
  *F16D 23/06* (2006.01)
(52) U.S. Cl.
  CPC ...... *F16D 23/06* (2013.01); *F16D 2023/0631* (2013.01); *F16D 2023/0637* (2013.01); *F16D 2023/0656* (2013.01)
(58) Field of Classification Search
  CPC ..... F16D 2023/0631; F16D 2023/0637; F16D 2023/0656; F16D 23/06; F16D 2023/0662; F16D 2023/0668
  See application file for complete search history.

(56) References Cited

U.S. PATENT DOCUMENTS

| | | | | |
|---|---|---|---|---|
| 4,674,614 A * | 6/1987 | Ikemoto | ............ | F16D 23/06 192/53.34 |
| 4,727,968 A * | 3/1988 | Chana | ............ | F16D 23/06 192/108 |
| 4,848,548 A * | 7/1989 | Diehl | ............ | F16D 23/06 192/69.9 |
| 4,969,369 A * | 11/1990 | Okubo | ............ | F16D 23/06 192/218 |
| 5,507,376 A * | 4/1996 | Skotnicki | ............ | F16D 23/06 192/48.91 |

(Continued)

FOREIGN PATENT DOCUMENTS

| | | | |
|---|---|---|---|
| DE | 102016104495 A1 * | 9/2017 | ............ F16D 23/04 |
| KR | 10-1998-058968 A | 10/1998 | |
| KR | 10-2017-0018220 A | 2/2017 | |

*Primary Examiner* — David R Morris
(74) *Attorney, Agent, or Firm* — Morgan, Lewis & Bockius LLP

(57) ABSTRACT

A transmission synchronizer apparatus may include a sleeve coupled to an external peripheral surface of a hub gear while moving axially, and clutch gears disposed at both sides of the hub gear, each selectively synchronizing and engaging with the sleeve according to the axial movement of the sleeve, wherein the transmission synchronizer includes a plurality of main sleeve teeth protruding radially from an internal peripheral surface of the sleeve while being distanced from one another, and an auxiliary sleeve tooth protruding radially from the internal peripheral surface of the sleeve while protruding from one side of each of the main sleeve teeth to have a height lower than the main sleeve tooth.

3 Claims, 5 Drawing Sheets

(56) References Cited

U.S. PATENT DOCUMENTS

| | | | | |
|---|---|---|---|---|
| 5,538,119 | A * | 7/1996 | Johnson, Jr. | F16D 23/06 192/108 |
| 7,163,093 | B2 * | 1/2007 | Miyamoto | F16D 23/06 192/108 |
| 8,162,118 | B2 * | 4/2012 | Marchie | F16D 23/06 192/108 |
| 8,550,226 | B2 * | 10/2013 | Falcone | F16D 23/06 192/209 |
| 9,528,558 | B2 * | 12/2016 | Sin | B22F 5/08 |
| 9,777,779 | B2 * | 10/2017 | Cousins | F16D 23/06 |
| 2005/0199466 | A1 * | 9/2005 | Miyamoto | F16D 23/06 192/53.1 |
| 2010/0288594 | A1 * | 11/2010 | Marchie | F16D 23/06 192/53.34 |
| 2012/0186929 | A1 * | 7/2012 | Falcone | F16D 23/06 192/53.34 |
| 2015/0167815 | A1 * | 6/2015 | Sin | B22F 5/08 192/108 |
| 2016/0273593 | A1 * | 9/2016 | Cousins | F16D 23/06 |
| 2017/0298997 | A1 * | 10/2017 | Damm | B21B 21/00 |
| 2018/0208057 | A1 * | 7/2018 | Yoshimura | B60K 17/02 |

* cited by examiner

TRANSMISSION SYNCHRONIZER

CROSS REFERENCE TO RELATED APPLICATION

The present application claims priority of Korean Patent Application No. 10-2017-0060553 filed on May 16, 2017, the entire contents of which is incorporated herein for all purposes by this reference.

BACKGROUND OF THE INVENTION

Field of the Invention

The present invention relates to a transmission synchronizer configured for forming two backlashes in a single sleeve to prevent noise from occurring due to a gear collision in both situations where the sleeve is removed and a vehicle travels.

Description of Related Art

In general, a synchronizer applied to a manual transmission or an automated manual transmission shifts gears in a vehicle by coupling or decoupling a sleeve to or from a clutch gear using a driving force transmitted from a shift operating mechanism.

In the process of shifting gears using such a synchronizer in the related art, the torque transferred from an engine or a motor to a drive wheel is interrupted while the current gear coupled to the sleeve of the synchronizer is decoupled therefrom. As such, the torque is retransferred from the engine or the motor to the drive wheel while the sleeve is coupled to a desired gear.

On the other hand, a separate torque interruption prevention device has been applied to a power train in recent years, to resolve torque interruption in the vehicle.

In the instant case, torque is not interrupted during gear shifting. Therefore, shocks may be caused due to the collision between the sleeve and the gear when the synchronizer is removed. The method of increasing the backlash of the synchronizer may be used to resolve the above problem. However, this method is not preferable since it may cause rattle noise due to an excessive increase of the backlash.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Accordingly, various aspects of the present invention are directed to providing a synchronizer which is applied to a transmission provided so as not to cause torque interruption and which prevents shocks from occurring during removal operation while preventing rattle noise from occurring during vehicle traveling.

Various aspects of the present invention are directed to providing a transmission synchronizer configured for improving noise, vibration, and harshness (NVH) performance by preventing shocks from occurring during removal operation or preventing rattle noise from occurring during vehicle travelling using a dual backlash applied thereto.

In accordance with an aspect of the present invention, a transmission synchronizer may include a sleeve coupled to an external peripheral surface of a hub gear while moving axially, and clutch gears disposed at both sides of the hub gear, each selectively synchronizing and engaging with the sleeve according to the axial movement of the sleeve. The transmission synchronizer may include a plurality of main sleeve teeth protruding radially from an internal peripheral surface of the sleeve while being distanced from one another, and an auxiliary sleeve tooth protruding radially from the internal peripheral surface of the sleeve while protruding from one side of each of the main sleeve teeth to have a height lower than the main sleeve tooth.

Each of the clutch gears may have a plurality of gear teeth protruding along external peripheral surface thereof, and pairs of main and auxiliary sleeve teeth of the sleeve may be inserted between the respective gear teeth distanced from one another.

Each of the gear teeth of the clutch gear may include an upper portion formed radially from the top portion of the tooth by a predetermined distance, and a lower portion formed from the upper portion to the root of the tooth, and the upper portion of the gear tooth may have a surface width smaller than the lower portion so that the upper portion has a smaller engagement length with the sleeve than the lower portion.

A boundary line between the upper portion and the lower portion of the gear tooth may be formed radially from the end portion of the auxiliary sleeve tooth.

Each of the main sleeve teeth of the sleeve may have a protrusion formed to protrude from an opposite side of a surface adjacent to the auxiliary sleeve tooth while protruding outwardly from the top portion of the main sleeve tooth by a certain distance.

As apparent from the above description, the transmission synchronizer having the above-mentioned structure can improve the NVH performance of the vehicle by preventing shocks from occurring during gear disengagement and preventing rattle noise from occurring during vehicle travelling.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
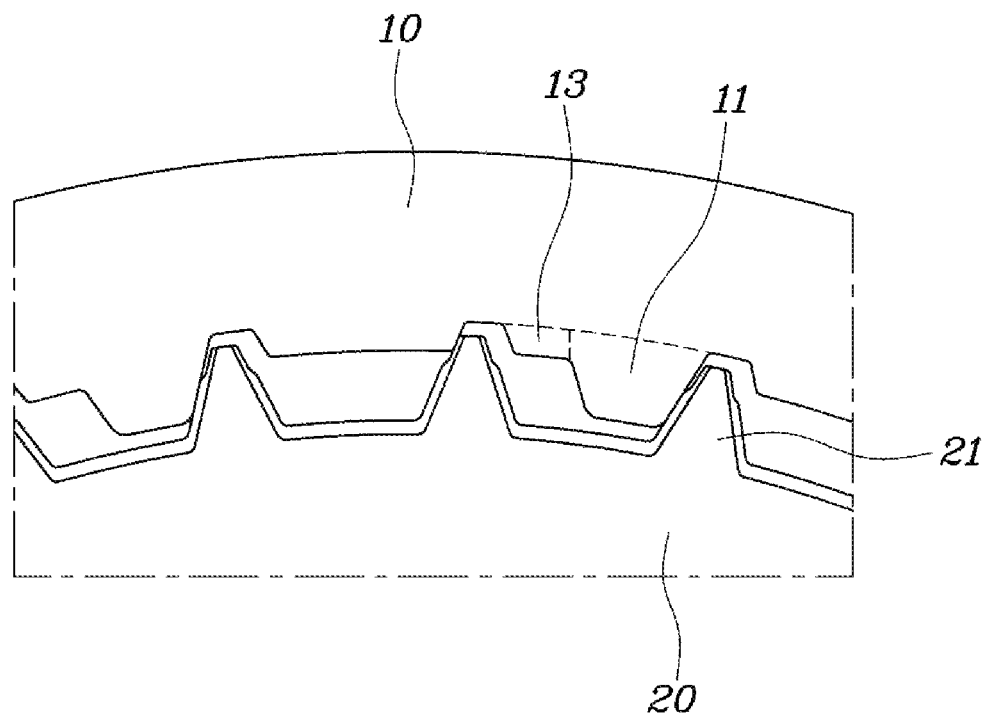
FIG. 1 is a front view illustrating a transmission synchronizer according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A transmission synchronizer according to the exemplary embodiments of the present invention will be described below with reference to the accompanying drawings.

Figure 2:
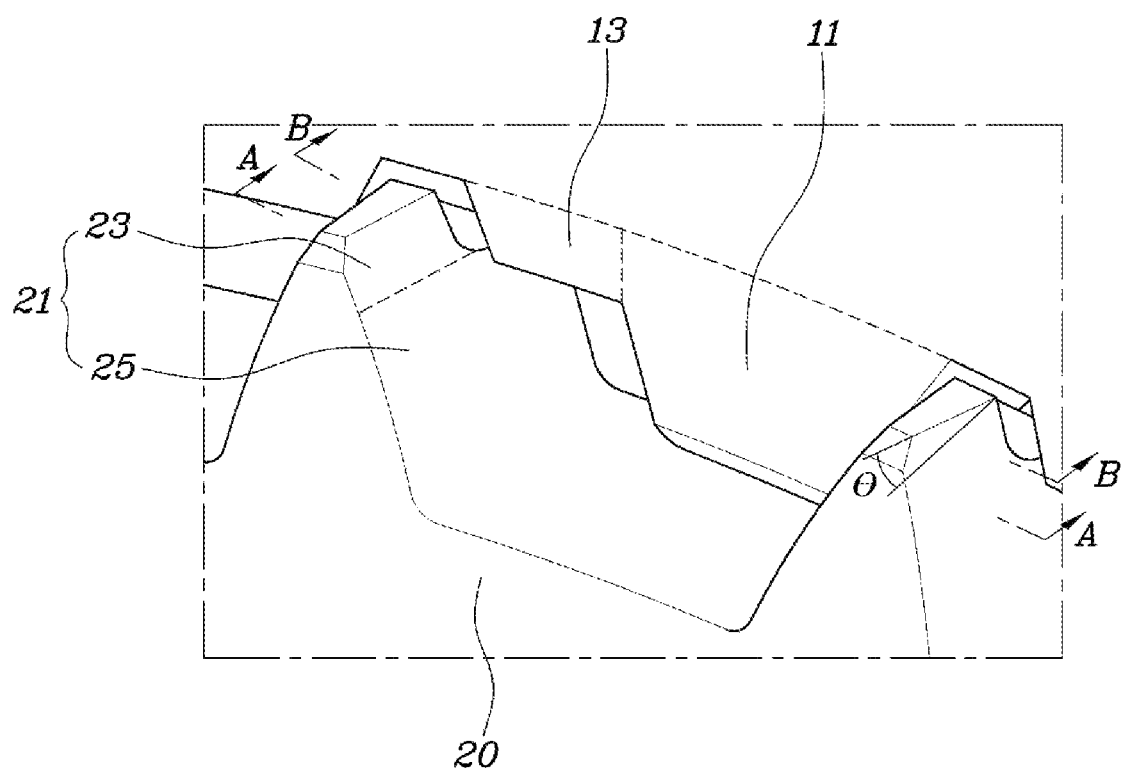
FIG. 2 is a perspective view illustrating the transmission synchronizer according to the exemplary embodiment of the present invention.

FIG. 1 is a front view illustrating a transmission synchronizer according to an exemplary embodiment of the present invention. FIG. 2 is a perspective view illustrating the transmission synchronizer according to the exemplary embodiment of the present invention.

Referring to FIG. 1 and FIG. 2, the transmission synchronizer according to the exemplary embodiment of the present invention may include a sleeve 10 which is coupled to the external peripheral surface of a hub gear while moving axially, and clutch gears 20 that are disposed at both sides of the hub gear, wherein each of the clutch gears 20 selectively synchronizes and engages with the sleeve 10 according to the axial movement of the sleeve 10. The transmission synchronizer may include a plurality of main sleeve teeth 11 that protrude radially from the internal peripheral surface of the sleeve 10 and are distanced from one another, and an auxiliary sleeve tooth 13 that protrudes radially from the internal peripheral surface of the sleeve 10 while protruding from one side of each of the main sleeve teeth 11 to have a height lower than the main sleeve tooth 11.

The sleeve 10 surrounds and is coupled to the external peripheral surface of the hub gear, which is spline-coupled to a main shaft, and is movable axially by a shift fork.

The clutch gears 20 are disposed at both sides of the hub gear, and each of the clutch gears 20 selectively synchronizes and engages with the sleeve 10 according to the axial movement of the sleeve 10. In the instant case, the sleeve 10 synchronizes with the speed of the clutch gear 20 through a synchronizer ring. When the speed synchronization is completed, the sleeve 10 is coupled to the clutch gear 20 while the teeth of the sleeve 10 engage with the teeth of the clutch gear 20.

In the exemplary embodiment of the present invention, the sleeve 10 is provided such that the main and auxiliary sleeve teeth 11 and 13 are alternately formed along the internal peripheral surface thereof.

Referring to FIG. 1, each of the main sleeve teeth 11 has a higher height than the auxiliary sleeve tooth 13. Assuming that the direction in which the main sleeve tooth 11 is in contact with the tooth of the clutch gear 20 is a forward direction, the auxiliary sleeve tooth 13 has a shape that adheres to the main sleeve tooth 11 at a reverse position to the main sleeve tooth 11.

Accordingly, the backlash formed by the main sleeve tooth 11 and the tooth of the clutch gear 20 may be longer than that formed by the auxiliary sleeve tooth 13 and the tooth of the clutch gear 20.

If a vehicle transmission continues to transmit torque from an engine or a motor to a drive wheel, the rotation speed of the sleeve 10 is faster than that of the clutch gear 20 when the sleeve 10 is decoupled from the clutch gear 20, which may lead to a collision between the sleeve 10 and the tooth of the clutch gear 20.

However, since the backlash formed by the main sleeve tooth 11 and the tooth of the clutch gear 20 for transmitting a driving force is large when the sleeve 10 rotates in the forward direction in the exemplary embodiment of the present invention, it is possible to reduce a collision between the sleeve 10 and the tooth of the clutch gear 20 when the sleeve 10 is decoupled from the clutch gear 20.

However, if the backlash between the sleeve 10 and the clutch gear 20 is merely large, rattle noise may occur while the vehicle travels. Accordingly, to reduce a possibility of occurrence of rattle noise while the vehicle travels in the exemplary embodiment of the present invention, the auxiliary sleeve tooth 13 has a relatively lower height than the main sleeve tooth 11 and has a small backlash.

In more detail, the clutch gear 20 has a plurality of gear teeth 21 protruding along the external peripheral surface thereof, and pairs of main and auxiliary sleeve teeth 11 and 13 of the sleeve 10 may be inserted between the respective gear teeth 21 that are distanced from one another.

Each of the gear teeth 21 of the clutch gear 20 includes an upper portion 23 which is formed radially from the top portion of the tooth by a predetermined distance, and a lower portion 25 which is formed from the upper portion 23 to the root of the tooth. The upper portion 23 of the gear tooth 21 has a surface width smaller than the lower portion 25, and the upper portion 23 has a smaller engagement length with the sleeve 10 than the lower portion 25.

Here, the boundary line between the upper portion 23 and the lower portion 25 of the gear tooth 21 is formed radially below the end portion of the auxiliary sleeve tooth 13.

For convenience of description, the gear tooth 21 of the clutch gear 20 will be provided to include the upper portion 23 and the lower portion 25. As illustrated in FIG. 2, the upper portion 23 of the gear tooth 21 has a surface width smaller than the lower portion 25, and the upper and lower portions 23 and 25 are aligned opposite to the entry of the sleeve 10.

Accordingly, when the sleeve 10 moves to and engages with the clutch gear 20, the auxiliary sleeve tooth 13 engages only with the upper portion 23 of the gear tooth 21, and the main sleeve tooth 11 engages with the lower portion 25 of the gear tooth 21. Therefore, it is possible to reduce the engagement length of the auxiliary sleeve tooth 13 with the clutch gear 20.

This is to prevent the sleeve 10 from colliding with the gear tooth 21 in the process in which the sleeve 10 is decoupled from the clutch gear 20 since the auxiliary sleeve tooth 13 has a small backlash. Accordingly, even when the sleeve 10 is decoupled from the clutch gear 20, the sleeve 10 may be decoupled from the clutch gear 20 without colliding with the gear tooth 21 thereof since the auxiliary sleeve tooth 13 has a small engagement length with the clutch gear 20.

On the other hand, since the main sleeve tooth 11 has a sufficient backlash with the clutch gear 20, there is a less possibility of colliding with the gear tooth 21 in the process in which the sleeve 10 is decoupled from the clutch gear 20.

Thus, since the lower portion 25 of the gear tooth 21 has a large surface width, it is possible to secure the durability of the clutch gear 20.

Figure 3:
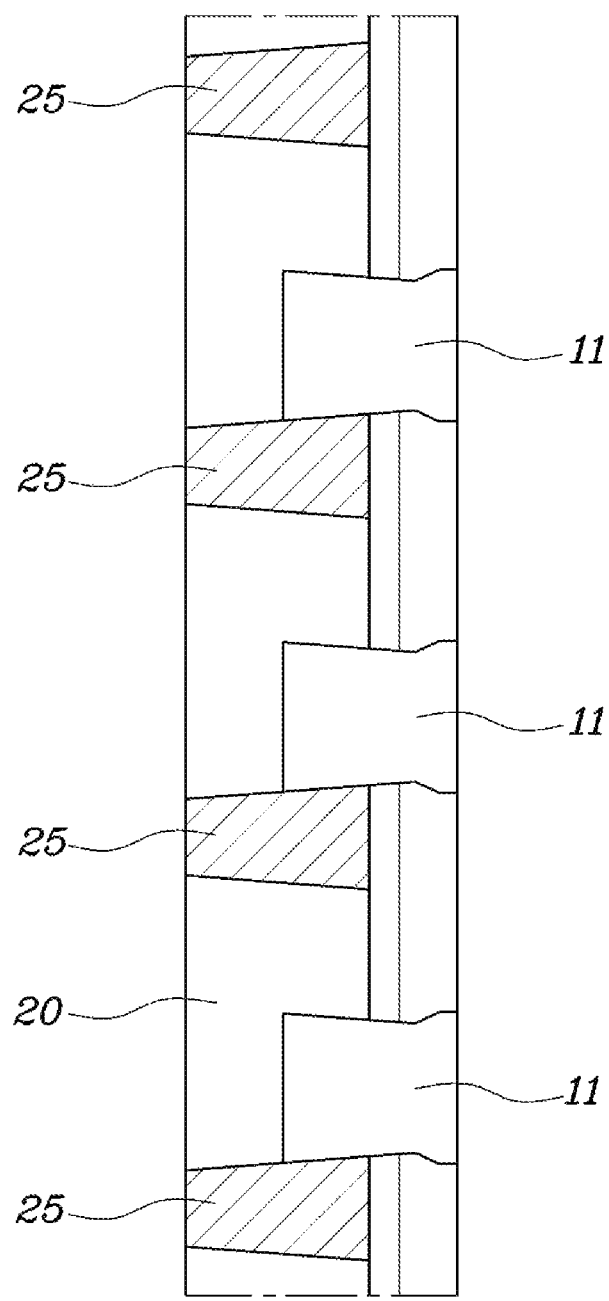
FIG. 3 is a cross-sectional view taken along line A-A of the transmission synchronizer according to the exemplary embodiment of the present invention in FIG. 2.
Figure 4:
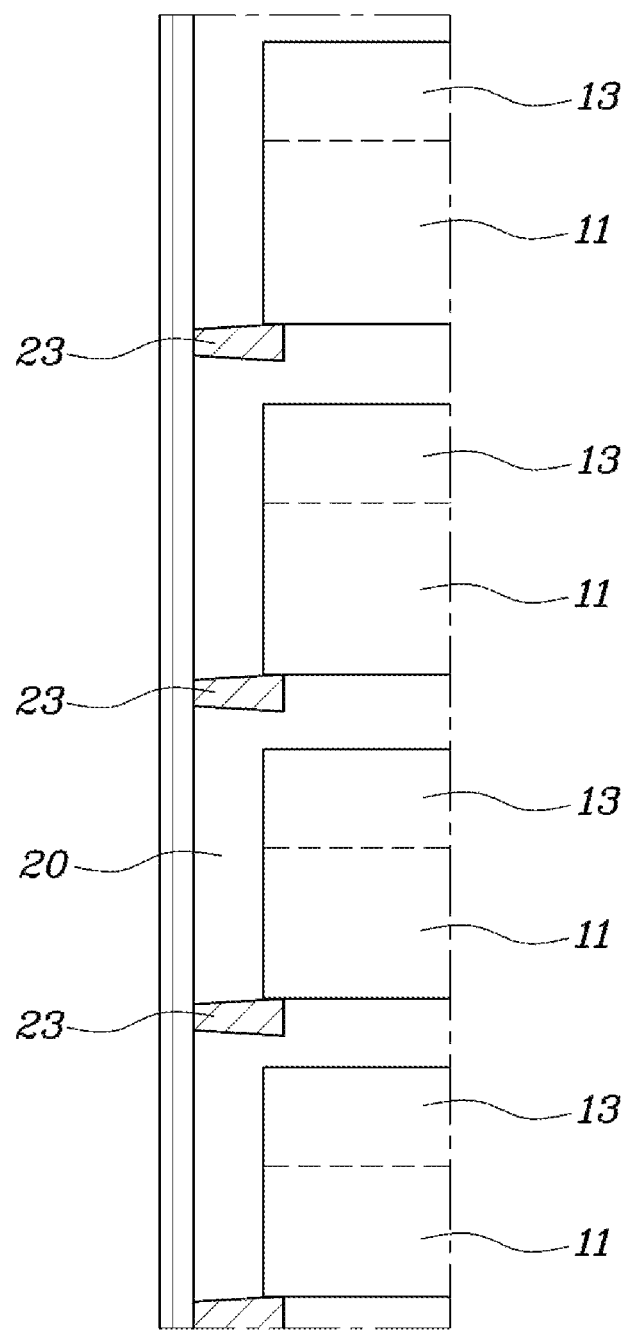
FIG. 4 is a cross-sectional view taken along line B-B of the transmission synchronizer according to the exemplary embodiment of the present invention in FIG. 2.

FIG. 3 is a cross-sectional view taken along line A-A of the transmission synchronizer according to the exemplary embodiment of the present invention in FIG. 2. FIG. 4 is a cross-sectional view taken along line B-B of the transmission synchronizer according to the exemplary embodiment of the present invention in FIG. 2.

First, referring to FIG. 2 and FIG. 3, the section A-A of the transmission synchronizer illustrates that the main sleeve tooth 11 of the sleeve 10 passes through the lower portion 25 of the gear tooth 21 of the clutch gear 20. In particularly, as illustrated in FIG. 3, a sufficient backlash is formed between the main sleeve tooth 11 and the lower portion 25.

Accordingly, when the sleeve is decoupled from the clutch gear 20, it is possible to prevent noise and vibration from occurring due to the collision between the main sleeve tooth 11 and the lower portion 25 of the gear tooth.

Referring to FIGS. 2 and 4, the section B-B of the transmission synchronizer illustrates that the main and auxiliary sleeve teeth 11 and 13 of the sleeve 10 pass through the upper portion 23 of the gear tooth 21 of the clutch gear 20.

When comparing FIG. 3 with FIG. 4, a small backlash is formed in the section B-B in which the auxiliary sleeve tooth 13 is continuously formed together with the main sleeve tooth 11. In the instant case, since the auxiliary sleeve tooth 13 engages only with the upper portion 23 of the gear tooth, the auxiliary sleeve tooth 13 has a relatively small engagement length with the gear tooth.

Accordingly, it is possible to prevent rattle noise from occurring through the auxiliary sleeve tooth 13 having a small backlash, and to prevent noise and vibration from occurring due to the collision between the sleeve and the clutch gear 20 when the sleeve is decoupled from the clutch gear 20.

Figure 5:
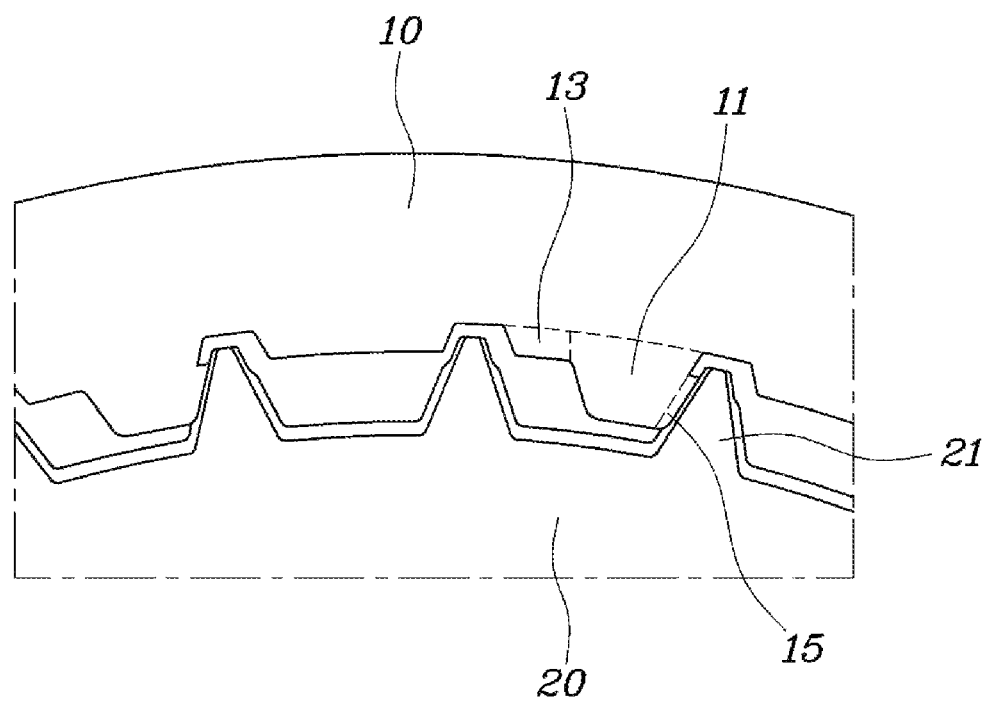
FIG. 5 is a front view illustrating a transmission synchronizer according to another exemplary embodiment of the present invention.

Meanwhile, FIG. 5 is a front view illustrating a transmission synchronizer according to another exemplary embodiment of the present invention. Referring to FIG. 5, a protrusion 15 may be formed in a main sleeve tooth 11 of a sleeve 10. The protrusion 15 protrudes from the opposite side of the surface adjacent to an auxiliary sleeve tooth 13 while protruding outwardly from the top portion of the main sleeve tooth 11 by a certain distance.

For convenience of description, a portion of the main sleeve tooth 11, which protrudes outwardly from the top portion thereof by a certain distance, will be designated by the lower portion of the main sleeve tooth 11, and the remaining portion will be designated by the upper portion of the main sleeve tooth 11.

The main and auxiliary sleeve teeth 11 and 13 of the sleeve 10 and a gear tooth 21 of a clutch gear 20 may be inversely tapered to secure gear engagement. However, it is difficult to inversely taper the upper portion of the main sleeve tooth 11. Only the lower portion of the main sleeve tooth 11 may be inversely tapered.

In the instant case, the upper portion of the main sleeve tooth 11, which is not inversely tapered, may first come into contact with the gear tooth 21 when the sleeve 10 moves in a forward direction thereof. For the present reason, a driving force may not be accurately transmitted to the drive wheel. Accordingly, the protrusion 15 is formed in the lower portion of the main sleeve tooth 11 for the lower portion of the main sleeve tooth 11, which is inversely tapered, to accurately synchronize and engage with the gear tooth of the clutch gear 20, which is inversely tapered in the same manner.

In accordance with the transmission synchronizer having the above-mentioned structure, it is possible to improve the NVH performance of the vehicle by preventing shocks from occurring during gear disengagement and preventing rattle noise from occurring during vehicle travelling.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission synchronizer apparatus including a sleeve coupled to an external peripheral surface of a hub gear while moving axially, and clutch gears disposed at a first side and a second side of the hub gear, each selectively synchronizing and engaging with the sleeve according to an axial movement of the sleeve, the transmission synchronizer apparatus comprising:
    a plurality of main sleeve teeth protruding radially from an internal peripheral surface of the sleeve while being distanced from one another; and
    an auxiliary sleeve tooth protruding radially from the internal peripheral surface of the sleeve while protruding from one side of respective main sleeve teeth to have a height lower than the respective main sleeve teeth,
    wherein respective clutch gears have a plurality of gear teeth protruding along an external peripheral surface thereof, and pairs of main and auxiliary sleeve teeth of the sleeve are inserted between respective gear teeth distanced from one another,
    wherein the respective gear teeth of the clutch gear includes an upper portion formed radially from a top portion of the respective gear teeth by a predetermined distance, and a lower portion formed from the upper portion to a root of the respective gear teeth; and
    wherein the upper portion of the respective gear teeth has a surface width smaller than the lower portion so that the upper portion has an engagement length with the sleeve smaller than the lower portion.

2. The transmission synchronizer apparatus according to claim 1, wherein a boundary line between the upper portion and the lower portion of the respective gear teeth is formed radially below an end portion of the auxiliary sleeve tooth.

3. The transmission synchronizer apparatus according to claim 1, wherein the respective main sleeve teeth of the sleeve has a protrusion formed to protrude from an opposite side of a surface adjacent to the auxiliary sleeve tooth while protruding outwardly from a top portion of the respective main sleeve teeth by a predetermined distance.

* * * * *